United States Patent
Diebel et al.

(10) Patent No.: US 11,841,081 B2
(45) Date of Patent: Dec. 12, 2023

(54) TRANSMISSION LOCK FOR ELECTRIC VEHICLE

(71) Applicant: Canoo Technologies Inc., Torrance, CA (US)

(72) Inventors: Jackson George Diebel, Hermosa Beach, CA (US); John Mason, Torrance, CA (US); Charles Garmel, Torrance, CA (US); Phillip John Weicker, Torrance, CA (US)

(73) Assignee: Canoo Technologies Inc., Torrance, CA (US)

( * ) Notice: Subject to any disclaimer, the term of this patent is extended or adjusted under 35 U.S.C. 154(b) by 0 days.

(21) Appl. No.: 17/398,752

(22) Filed: Aug. 10, 2021

(65) Prior Publication Data

US 2022/0042599 A1 Feb. 10, 2022

Related U.S. Application Data

(60) Provisional application No. 63/063,926, filed on Aug. 10, 2020.

(51) Int. Cl.
 *F16H 63/34* (2006.01)
 *F16H 53/00* (2006.01)

(52) U.S. Cl.
 CPC ......... *F16H 63/3425* (2013.01); *F16H 53/00* (2013.01)

(58) Field of Classification Search
 CPC .............................. F16H 63/3425; F16H 53/00
 See application file for complete search history.

(56) References Cited

U.S. PATENT DOCUMENTS 3,703,941 A 11/1972 Ohie et al.
5,696,679 A * 12/1997 Marshall ............. F16H 63/3416
 701/1

(Continued)

FOREIGN PATENT DOCUMENTS

WO WO-2016096511 A1 * 6/2016 ......... F16H 63/3425

OTHER PUBLICATIONS

International Search Report and Written Opinion of the International Searching Authority dated Nov. 17, 2021, in connection with International Application No. PCT/US2021/045419, 9 pages.

(Continued)

*Primary Examiner* — Stacey A Fluhart
*Assistant Examiner* — Aimee Tran Nguyen

(57) ABSTRACT

A park lock for an output drive gear includes a pawl, a rotational cam, and a rotational spring. The pawl has an engagement protrusion that extends outward from a body disposed on a pawl rotational shaft, such that rotation moves the engagement protrusion toward the output drive gear. The rotational cam rotates such that a circumferential side engages with a portion of the pawl opposite the engagement protrusion, causing rotation of the pawl about the rotational pawl shaft to move the engagement protrusion towards the output drive gear. The rotational spring maintains tension on the pawl and cam such that the engagement protrusion maintains an engagement with the output drive gear based on rotation of the cam and a speed of the output drive gear.

20 Claims, 16 Drawing Sheets

(56) References Cited

U.S. PATENT DOCUMENTS

| | | | |
|---|---|---|---|
| 6,725,962 B1* | 4/2004 | Fukuda | F16D 63/006 |
| | | | 192/219.5 |
| 9,272,690 B2* | 3/2016 | Burgardt | F16H 63/3425 |
| 9,869,389 B2* | 1/2018 | Rhoades | F16H 63/3433 |
| 2007/0158161 A1* | 7/2007 | Fujimoto | F16H 63/3416 |
| | | | 192/219.4 |
| 2009/0193931 A1 | 8/2009 | Burgardt et al. | |
| 2014/0060994 A1 | 3/2014 | Burgardt | |
| 2014/0346004 A1 | 11/2014 | Landino et al. | |
| 2016/0033037 A1 | 2/2016 | Rhoades et al. | |

OTHER PUBLICATIONS

Andersson, Rasmus Andreas, "CAE Tool for Evaluation of Park Lock Mechanism in a DCT Transmission," Master's Thesis, Karlstads Universitet, Jul. 19, 2017, 42 pages.

* cited by examiner

TRANSMISSION LOCK FOR ELECTRIC VEHICLE

CROSS-REFERENCE TO RELATED APPLICATIONS

This application claims priority to U.S. Provisional Patent Application No. 63/063,926 filed Aug. 10, 2020 and entitled TRANSMISSION LOCK FOR ELECTRIC VEHICLE. The content of the above-identified patent document(s) is incorporated herein by reference.

TECHNICAL FIELD

This disclosure relates generally to transmission lock systems. More specifically, this disclosure relates to improved transmission park or stopping mechanisms for electric vehicles, their design, methods of manufacture, component systems, and materials.

BACKGROUND

Recent advances in electric motor and battery technologies have made electric vehicles practical to manufacture. Electric vehicles (EVs) have a number of advantages over conventional internal combustion vehicles, including the dramatically reduced footprint of the drive train components. Further advancements in signal processing and drive-by-wire technologies means that vehicle platforms containing all the necessary functional components of a vehicle are now possible to produce. However, despite the potential these advancements represent, most EVs being produced continue to incorporate designs that have been traditionally used in internal combustion engines. This is particularly true in terms of automatic transmissions and the mechanisms used to keep the transmissions from engaging when placing the vehicle in a parked configuration. In other words, the locking mechanisms used to stop the automatic transmission from driving the vehicle when placed in a parked position have not been adapted to take advantage of EV platforms.

SUMMARY

In one embodiment, a park lock is provided for an automatic transmission that includes an output drive gear. The output drive gear is disposed on an output drive shaft and has a plurality of engagement projections extending outwardly from a circular body, where the engagement projections form an engagement space between the engagement projections. The park lock includes a pawl having a body with an engagement protrusion that extends outward from the body, the body disposed on a pawl rotational shaft such that rotation of the rotational shaft rotates the engagement protrusion in a direction of the output drive gear. The park lock also includes a rotational cam disposed on a cam shaft that is rotated such that a circumferential cam side face engages with a portion of the pawl opposite the engagement protrusion to cause rotation of the pawl about the rotational pawl shaft to thereby move the engagement protrusion towards the output drive gear into one of the engagement spaces between the engagement projections. The park lock further includes at least one torsion spring connected to maintain tension on the pawl and cam such that the engagement protrusion maintains an engagement with the engagement spaces and engagement projections that is based on rotation of the cam and a speed of the output drive gear.

In another embodiment, a method of locking an automatic transmission includes disposing an output drive gear on an output drive shaft and having a plurality of engagement projections extending outwardly from a circular body and wherein the engagement projections form an engagement space between the engagement projections. A pawl having a body with an engagement protrusion extending outward from the body is provided, with the body disposed on a pawl rotational shaft such that rotation of the rotational shaft rotates the engagement protrusion in a direction of the output drive gear. A rotational cam is disposed on a cam shaft that is rotated such that a circumferential cam side face engages with a portion of the pawl opposite the engagement protrusion to cause rotation of the pawl about the rotational pawl shaft to thereby move the engagement protrusion towards the output drive gear into one of the engagement spaces between the engagement projections. At least one torsion spring is connected to maintain tension on the pawl and cam such that the engagement protrusion maintains an engagement with the engagement spaces and engagement projections that is based on rotation of the cam and a speed of the output drive gear.

For either embodiment, the circumferential cam side face of the rotational cam has a region of increasing radius, which may be a stepped change in radius.

For either embodiment, the at least one torsion spring may comprise nested torsion springs, and is formed by one of a first torsion spring wrapped around a rotation shaft for the pawl or the first torsion spring together with a second torsion spring wrapped around the cam shaft.

For either embodiment, the park lock may include a stopping flange configured to limit movement of the pawl, where the stopping flange may comprise a stopping pin configured to be stopped by stopping pegs on a fixed stopping plate or a bent portion configured to contact a surface of the rotational cam.

For either embodiment, the pawl and the rotational cam are mounted inside a removable portion of a casing for a drive assembly.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 9C, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

Park locks, required by regulation for vehicles with an automatic transmission, are often implemented by a cone shifted axially to move a pawl, held in the locking position by a linear spring. In the present disclosure, a pawl is moved by a cam, held in the locking position by a torsion spring (or nested torsion springs). The difference in the mechanism for engaging the park lock allows the components to be packaged in a smaller space, with simpler functional components. In addition, conventional park lock designs that are attached to the shifter incorporate a rachet mechanism in case the shifter is accidentally knocked into park while traveling at a significant rate of speed, enabling the drive gear to slow to a safe speed before fully engaging the park lock. For vehicles with an electronic actuator attached to the shifter, the various designs of the present disclosure could potentially eliminate the rachet.

In accordance with embodiments of the present disclosure, automatic transmission-locking mechanisms (e.g., park lock systems), generally in relation to electric vehicles, include several components that function to lock or disengage the transmission system from the components that operate to drive the vehicle. In some embodiments, the park lock system has a pawl rotatably connected to an actuator device, where the pawl has a body with a tooth portion that extends outward from the body and is designed to cooperatively engage with a gear selector or drive gear of a transmission system. Other embodiments may include a rotatable cam with a body that has a ramped changing radius that engages with the pawl, causing the pawl to rotate into the gear selector or drive gear. In some embodiments, the position of the pawl and rotatable cam is maintained by one or more torsion springs coaxially positioned with respect to the rotatable axis of the pawl and cam.

Figure 1:
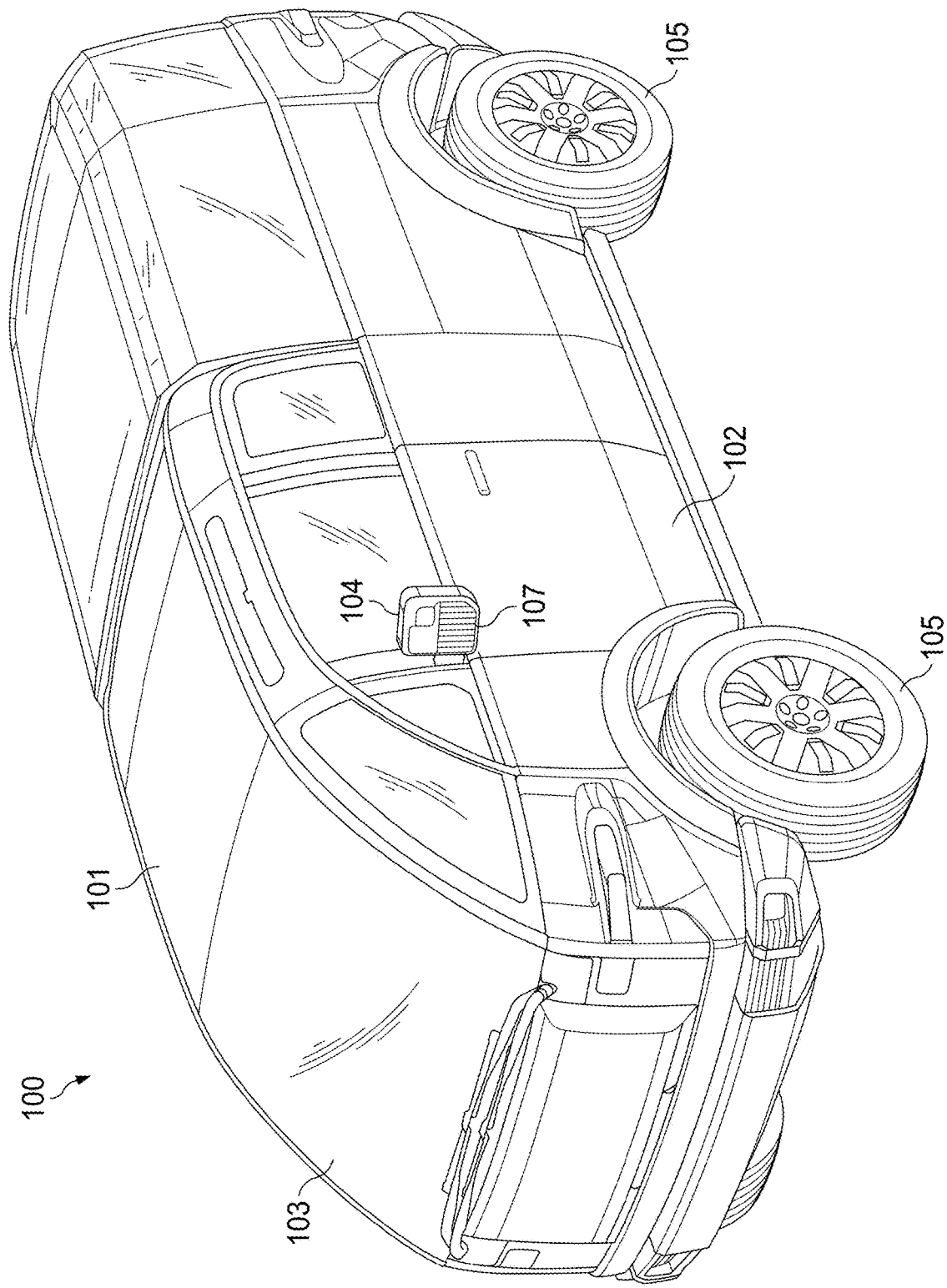
FIG. 1 is a perspective view of a vehicle within which improved transmission park lock is implemented in accordance with embodiments of the present disclosure.

FIG. 1 is a perspective view of a vehicle within which improved transmission park lock is implemented in accordance with embodiments of the present disclosure. The embodiment of the vehicle 100 illustrated in FIG. 1 is for illustration and explanation only. FIG. 1 does not limit the scope of this disclosure to any particular implementation of a vehicle.

The vehicle 100 of FIG. 1 includes a chassis (not visible in FIG. 1) supporting a cabin 101 for carrying passengers. In some embodiments, the vehicle 100 is an EV in which the chassis is in the form of a "skateboard" vehicle platform supporting one or more energy storage elements (e.g., batteries) that provide input electrical power used by various components of the EV, such as one or more electric motors of the vehicle 100 and a control system of the electric vehicle described in further detail below.

Passengers may enter and exit the cabin 101 through at least one door 102 forming part of the cabin 101. A transparent windshield 103 and other transparent panels mounted within and forming part of the cabin 101 allow at least one passenger (referred to as the "operator," even when the vehicle 100 is operating in an AD mode) to see outside the cabin 101. Rear view mirrors 104 mounted to sides of the cabin 101 enable the operator to see objects to the sides and rear of the cabin 101 and may include warning indicators (e.g., selectively illuminated warning lights) for features such as blind spot warning (indicating that another vehicle is in the operator's blind spot) and/or lane departure warning.

Wheels 105 mounted on axles that are supported by the chassis and driven by the motor(s) (all not visible in FIG. 1) allow the vehicle 100 to move smoothly. The wheels 105 are mounted on the axles in a manner permitting rotation relative to a longitudinal centerline of the vehicle 100 for steering and are also connected to steering controls (not visible). Conventional automobile features such as headlamps, taillights, turn signal indicators, windshield wipers, and bumpers are also depicted. The vehicle 100 may further include cargo storage within or connected to the cabin 101 and mounted on the chassis, with the cargo storage area(s) optionally partitioned by dividers from the passenger area(s) of the cabin 101.

Although FIG. 1 illustrates one example of a vehicle 100, those skilled in the art will recognize that the full structure and operation of a suitable vehicle are not depicted in the drawings or described here. Instead, for simplicity and clarity, only the structure and operation necessary for an understanding the present disclosure is depicted and described. Various changes may be made to the example of FIG. 1, and the improved transmission park lock described in this disclosure may be used with any other suitable vehicle.

Figure 2:
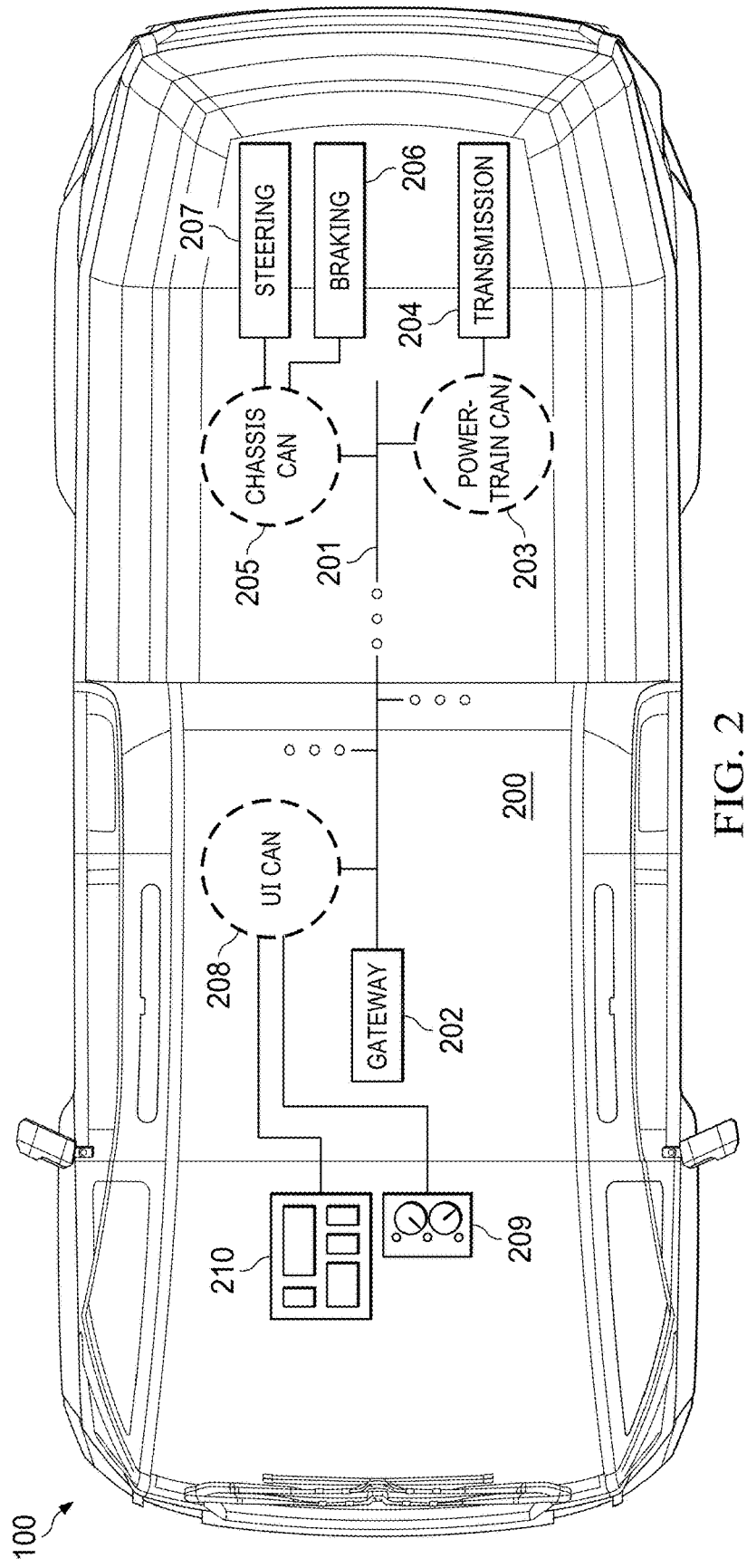
FIGS. 2 and 2A depict a vehicle control system for a vehicle within which improved transmission park lock is implemented in accordance with embodiments of the present disclosure.
Figure 2A:
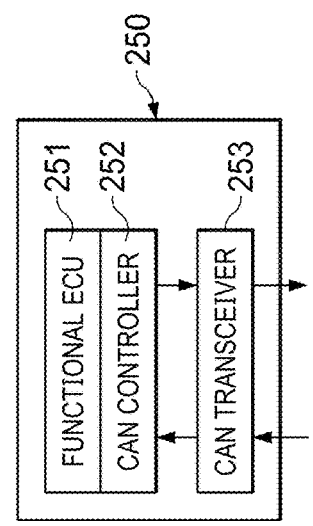

FIGS. 2 and 2A depict a vehicle control system 200 for a vehicle within which improved transmission park lock is implemented in accordance with embodiments of the present disclosure. The embodiment of the vehicle control system 200 illustrated in FIGS. 2 and 2A is for illustration and explanation only. FIGS. 2 and 2A do not limit the scope of this disclosure to any particular implementation of a vehicle control system.

FIG. 2 depicts a modern vehicle control system 200 utilizing various electronic control units (ECUs) interconnected on a controller area network (CAN) via the so-called CAN bus. The standard for the CAN bus was released around 1993 by the International Organization for Standardization (ISO) as ISO 11898. The current version of that standard is ISO 11898-1:2015, and the CAN busses described herein may comply with that standard in some embodiments. Each ECU typically includes a printed circuit board (PCB) with a processor or microcontroller integrated circuit coupled to various input sensors, switches, relays, and other output devices. The CAN design permits the ECUs to communicate with each other without the need for a centralized host. Instead, communication takes place on a peer-to-peer basis. The CAN design therefore permits data from sensors and other ECUs to circulate around the vehicle ECUs, with each ECU transmitting sensor and programming information on the CAN bus while simultaneously listening to the CAN bus to pull out data needed to complete tasks being performed by that ECU. There is no central hub or routing system, just a continuous flow of information available to all the ECUs.

By way of example, power doors on a vehicle may be operated by an ECU called the body control module (not shown in FIG. 2). Sensors constantly report whether the doors are open or closed. When the driver pushes a button to close a door, the signal from that switch is broadcast across the CAN bus. When the body control module ECU detects that signal, however, the body control module ECU does not simply close the door. Instead, the body control module ECU first checks the data stream to make sure the vehicle is in park and not moving and, if all is well, gives a command to a power circuit that energizes the motors used to close the door. The body control module ECU may go even further, such as by monitoring the voltage consumed by the motors. If the body control module ECU detects a voltage spike, which happens when a door is hindered by an errant handbag or a wayward body part, the ECU immediately reverses the direction of the door to prevent potential injury. If the door closes properly, the latch electrically locks the door shut, which is an event that may be detected by the body control module ECU.

Notably, vehicle control systems are migrating to higher-speed networks with an Ethernet-like bus for which each ECU is assigned an Internet protocol (IP) address. Among other things, this may allow both centralized vehicle ECUs and remote computers to pass around huge amounts of information and participate in the Internet of Things (IoT).

In the example shown in FIG. 2, the vehicle control system 200 includes a CAN bus 201 embodied or controlled by a gateway ECU 202, which facilitates messages on and among CANs, transmitted and detected by ECUs. FIG. 2 illustrates a powertrain CAN 203 to which a transmission ECU 204 is connected and a chassis CAN 205 to which a braking ECU 206 and a steering (e.g., steering angle) ECU 207 are connected. The braking ECU 206 is connected to brake actuator(s) (not shown) for emergency and normal braking, while the steering ECU 207 is connected to a steering drive motor for evasive and normal steering. The vehicle control system 200 in FIG. 2 also includes a user interface (UI) CAN 208 to which a "dashboard" ECU 209 and a touchscreen ECU 210 are connected. The ECUs 209 and 201 may be integrated with the respective dashboard controls and touchscreen. The UI CAN 208 and the associated dashboard ECU 209 and touchscreen 210 allow the operator to set operating parameters such as following distance for ACC, enable or disable ADAS indicators such as blind spot detection or collision warning, and the like. The dashboard ECU 209 may be connected to sensors and indicators other than those on the dashboard, such as the rear view mirror blind spot indicators described above. The ADAS indicators may include illuminated indicators on any combination of the dashboard and the rear view mirrors and/or in a heads-up display projected onto the windshield 103; audio warnings sounded on the vehicle's audio system speakers; and/or haptic indicators such as a vibrator within the vehicle operator's seat.

FIG. 2A illustrates a high level block diagram for the architecture 250 of each CAN depicted in FIG. 2. Each CAN shown in FIG. 2, including the powertrain CAN 203, includes a functional ECU 251 for the specific function performed by the respective CAN (e.g., image processing in the case of powertrain CAN 203). The functional ECU 251 is coupled to a CAN controller 252 that controls the interactions of the respective CAN with the other CANs within the vehicle 100 through the gateway ECU 202. A CAN transceiver 253 receives messages from and transmit messages to other CANs under the control of the CAN controller 252.

Although FIGS. 2 and 2A illustrate one example of a vehicle control system 200, those skilled in the art will recognize that the full structure and operation of a suitable vehicle control system is not depicted in the drawings or described here. Instead, for simplicity and clarity, only the structure and operation necessary for an understanding the present disclosure is depicted and described. Various changes may be made to the example of FIGS. 2 and 2A, and the improved transmission park lock described in this disclosure may be used with any other suitable vehicle control system.

To support various functions such as collision detection, the powertrain CAN 203 for the vehicle 100 controls a transmission park lock of the vehicle 100.

Figure 3A:
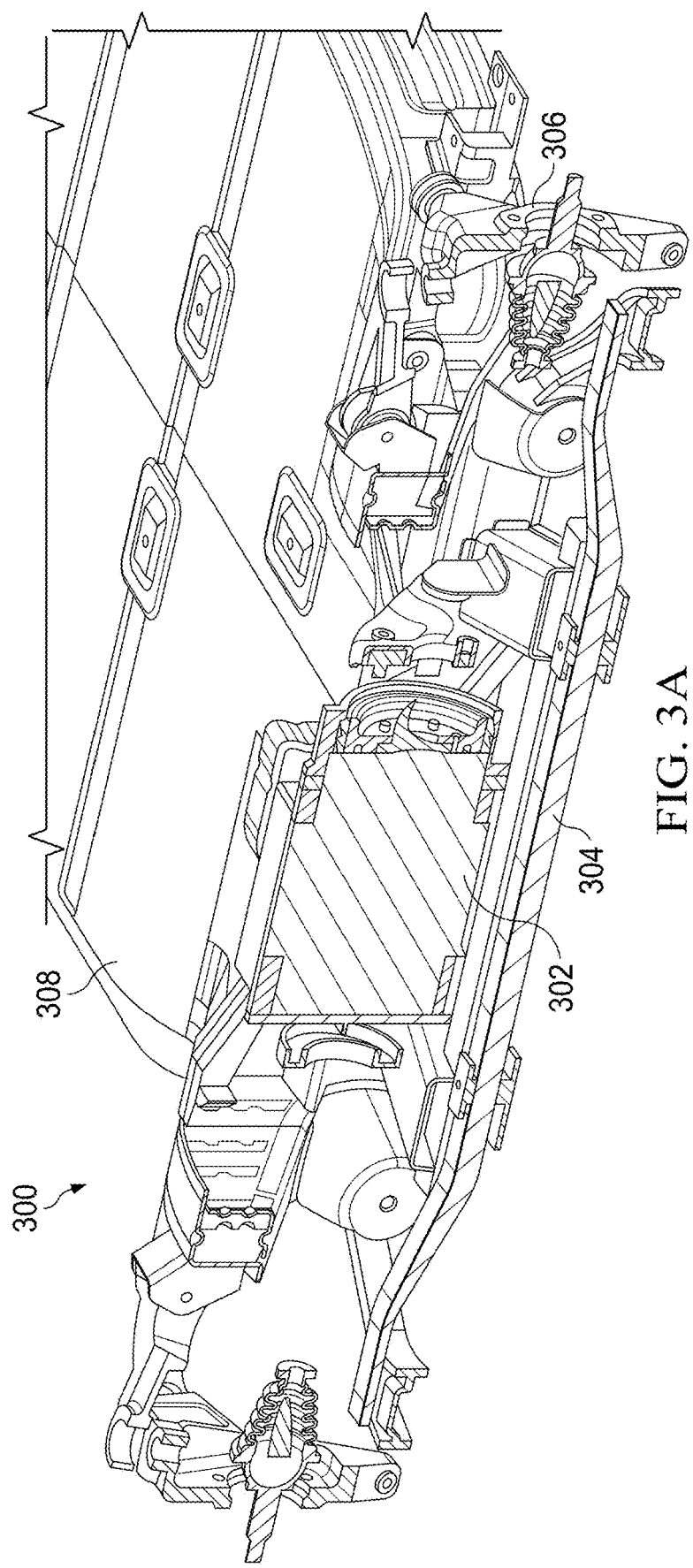
FIGS. 3A through 3B and 4 illustrate an embodiment of an electronic drive system positioned within the framework of a vehicle platform.
Figure 3B:
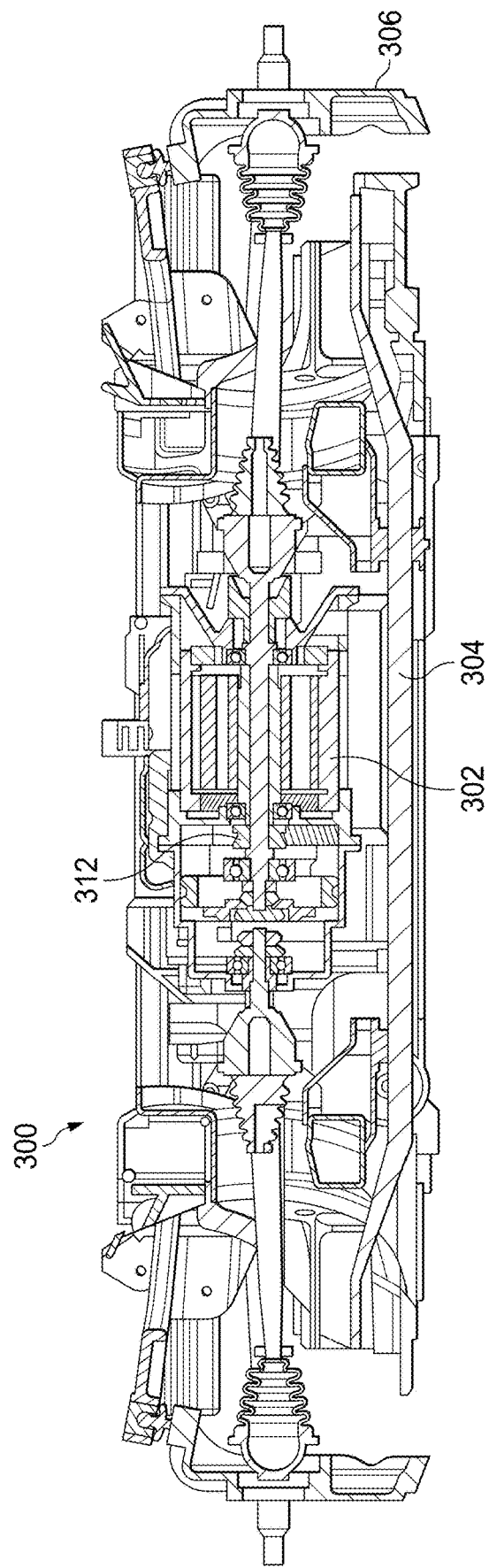
Figure 4:
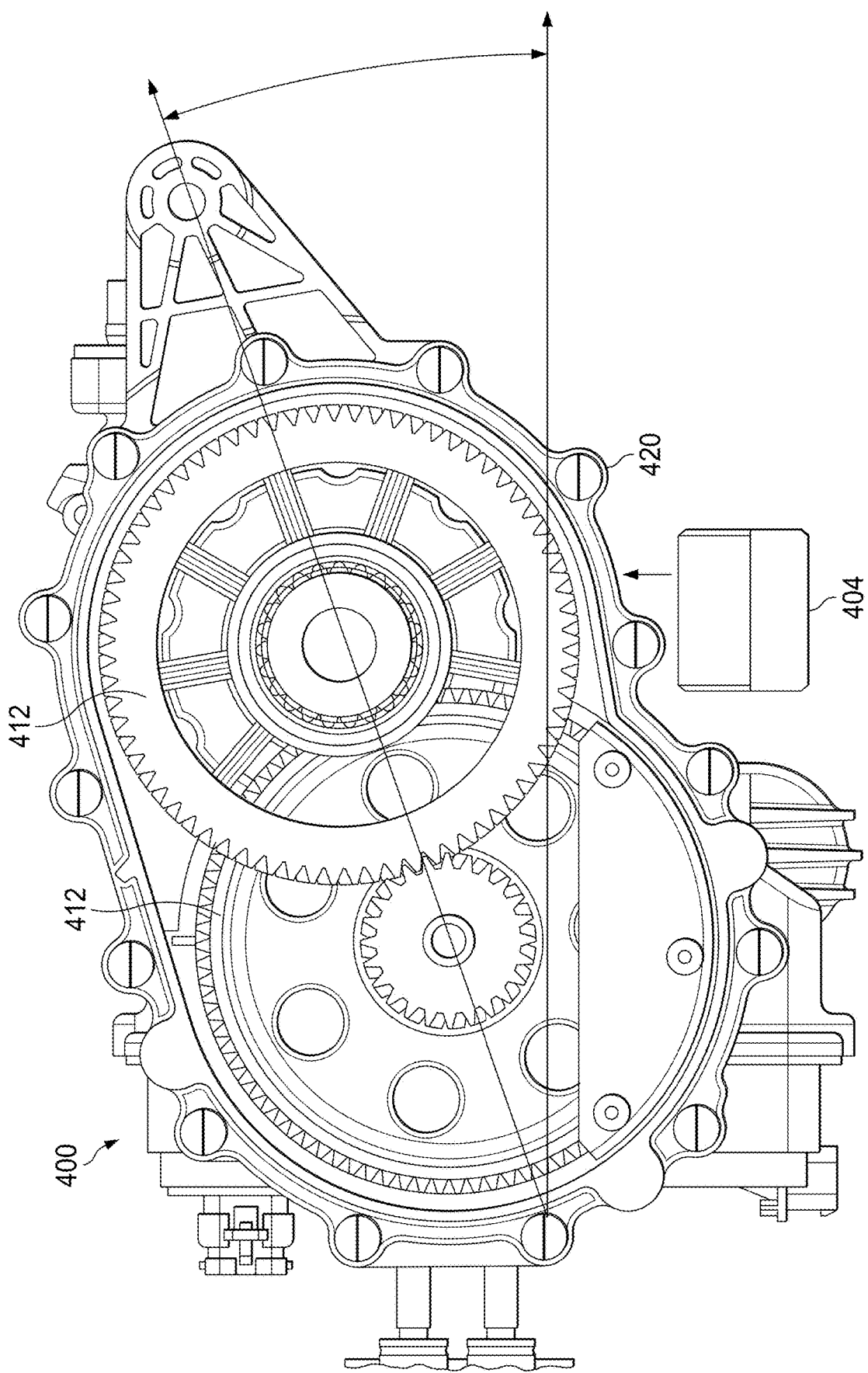

FIGS. 3A through 3B and 4 illustrate an embodiment of an electronic drive system 302 positioned within the framework of a vehicle platform 100. The electronic drive system 302, in many embodiments, may be positioned within the framework of the vehicle platform 100 such that the electronic drive system 302 rests above a portion of a suspension system. For example, in some embodiments, the suspension system may comprise a transverse flat spring 304 that is contoured such that the center section rests below the electronic drive system 302. In many embodiments, the electronic drive system 302 may be flanked on either side by the wheel mounting system 306. In many embodiments, the electronic drive system 302 may be powered by a power element 308. In some such embodiments, the power element may be in the form of modular battery elements (not shown).

Referring to FIGS. 3B and 4, other (cross sectional) views of an electronic drive system 302 are presented, in further detail. In accordance with many embodiments, the electronic drive system may be configured with one or more drive gears 312 and 412. Accordingly, many embodiments enclose the drive gears (312 and 412) in a casing 420 that houses the gears (312 and 412) such that the gears may be surrounded by any number of fluids that can help the gears to engage and disengage.

Figure 5A:
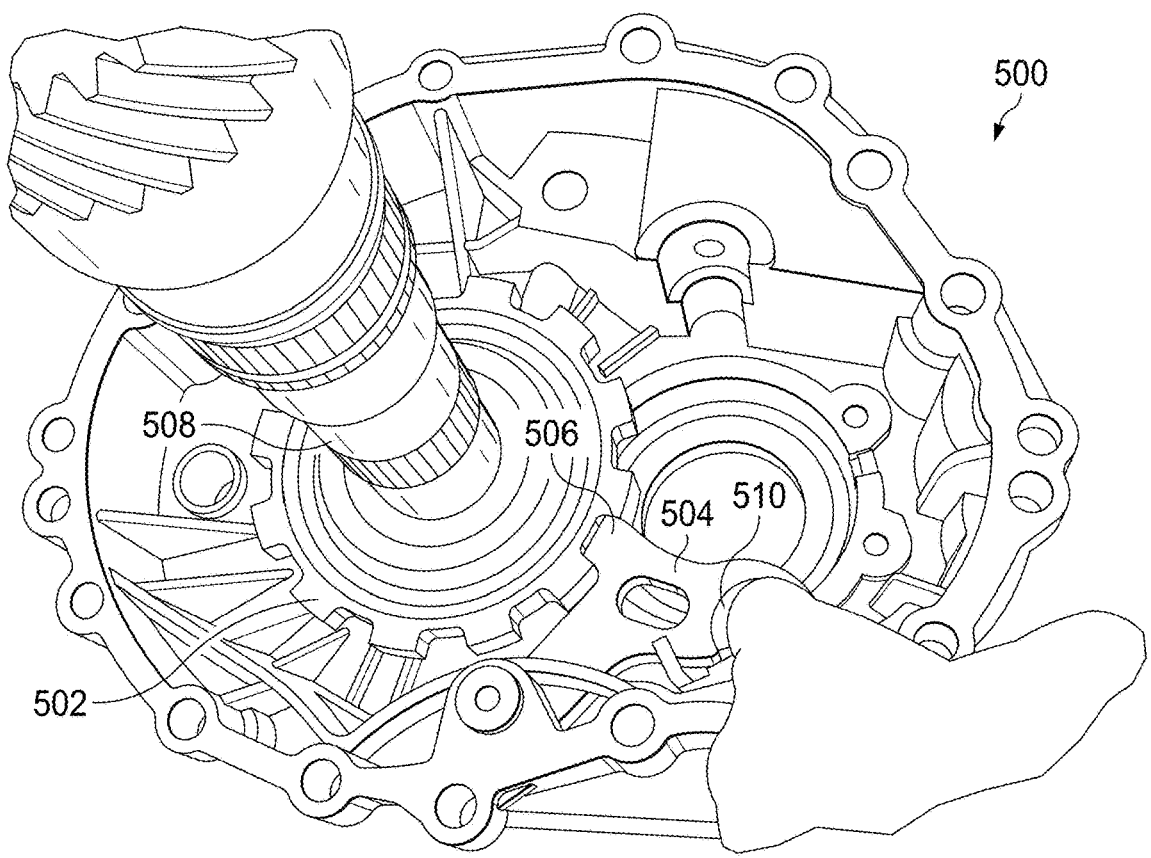
FIGS. 5A and 5B illustrate an exemplary park lock.
Figure 5B:
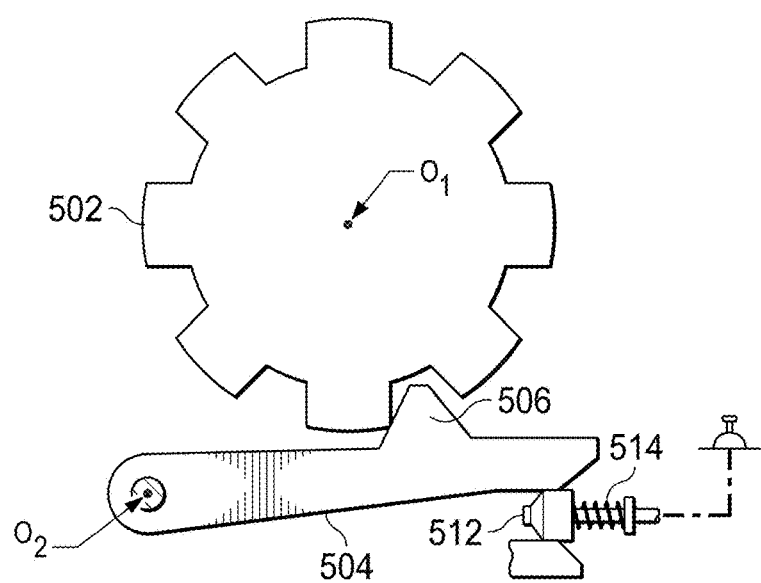

Referring now to FIGS. 5A and 5B, typical park lock systems are illustrated. As with many automatic drive systems commonly found in internal combustion engines, many electronic engines are comprised of a variety of drive gears that cooperatively engage in one or more sequences with an output shaft 508 to generate the necessary torque to drive the wheels of the vehicle. In many such systems, the output shaft 508 has an output drive gear 502 incorporated with the output shaft 508. In such automatic drive systems, the internal drive gears can be prevented from being moved by the output drive gear 502 by way of a pawl 504. The pawl 504 is designed with an integrated tooth like extension 506 that extends outward from the shaft or main body. The tooth 506 is designed to engage with the output drive gear 502 and stop the output shaft 508 from being moved by with the drive gears (not shown) of the transmission. In various types of park locks known in the art, the pawl 504 is driven to engage with the output drive gear 502 by way of a conical shaped pin 512. In some of these systems, the pin 512 would cooperatively engage a conical shaped hole 510. Other systems use a linear spring 514 to apply a linear pressure to the pin 512. In either design, the pawl 504 is moved into the output drive gear 502.

Figure 6:
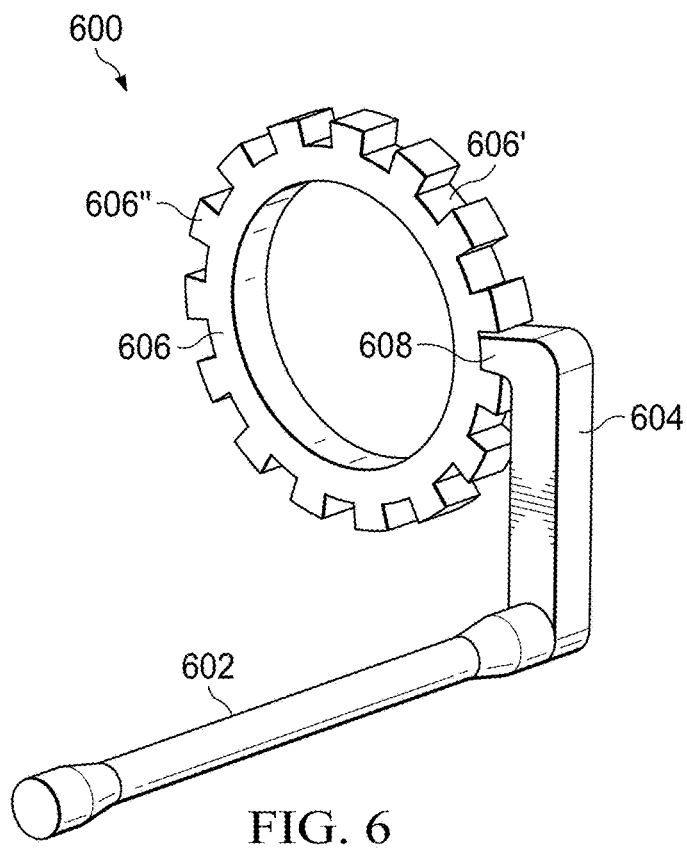
FIGS. 6 and 7A through 7G illustrate embodiments of a park lock system in accordance with the present disclosure.

FIGS. 6 and 7A through 7G illustrate embodiments of a park lock system in accordance with the present disclosure. FIG. 6 illustrates an embodiment of a park lock system 600 that has a pawl 604 connected to a spring-biased actuator shaft 602 that may be connected to an actuator. In one embodiment, a shaft on which the pawl 604 is mounted may be fixed on one end and have a rotational spring constant. The pawl 604, in accordance with the present disclosure, may be configured such that a protrusion 608 from the main body of the pawl extends outwardly and is designed to engage with an output drive gear 606. The pawl 604 may take on any design suitable to engage the output drive gear

606. The output drive gear 606 may have multiple protrusions ("teeth") 606' that extend outward from the circular body and are spaced apart by multiple spaces 606". The plurality of spaces 606" are configured to engage with the protrusion 608 from the pawl 604.

The pawl 604 may not constantly engage with the output drive gear 606, but instead can be rotatably engaged with the gear upon receipt of an input. For example, the input, in accordance with some embodiments, may be a mechanical input translated from a user interface. In other embodiments, the input may be an electronic signal from control system or a user interface. For any such input, the use of a torsional spring actuator shaft 602 electromechanically connected to the input and mechanically connected to the pawl 604. Accordingly, upon receipt of the corresponding input, the torsional spring actuator shaft 602 may drive the pawl 604 rotationally towards the output drive gear 606 so that the pawl 604 engages with the output drive gear 606 and stops all mechanical output to the wheels. Measurable engagement of the pawl 604 with the output drive gear 606 is designed to allow the pawl 604 to ratchet with the output drive gear until the rotation is slow enough for the pawl 604 to fully engage with the spaces 606' of the output drive gear 606. Full engagement places the vehicle in a park position and preventing the vehicle from moving. In many embodiments, the pawl 604 may be maintained in the engaged position by way of a spring (not shown), with the spring providing the necessary tension to prevent the pawl 604 from inappropriately disengaging from the output drive gear 606. Likewise, an input may also result in the pawl 604 disengaging from the output drive gear 606 and allowing the vehicle to move.

Figure 7A:
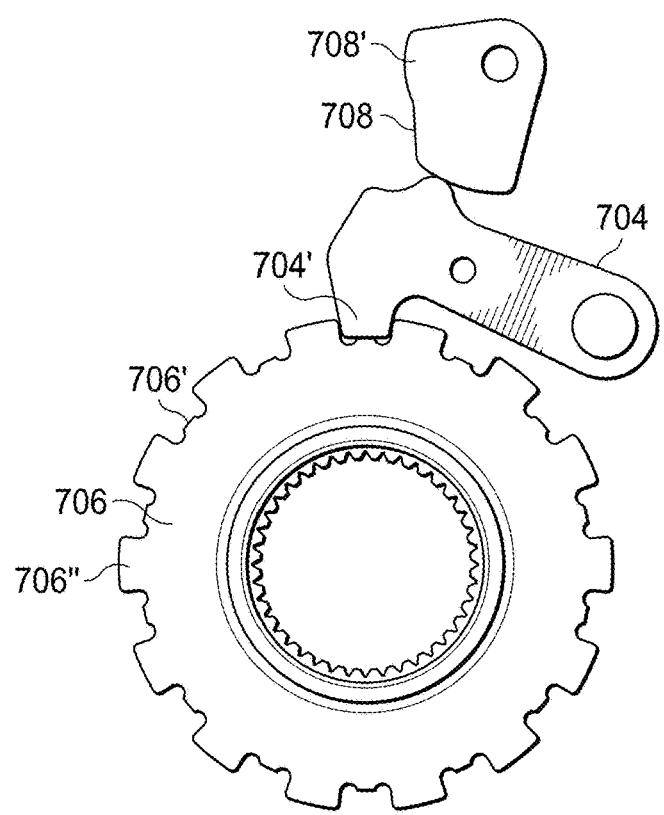
Figure 7C:
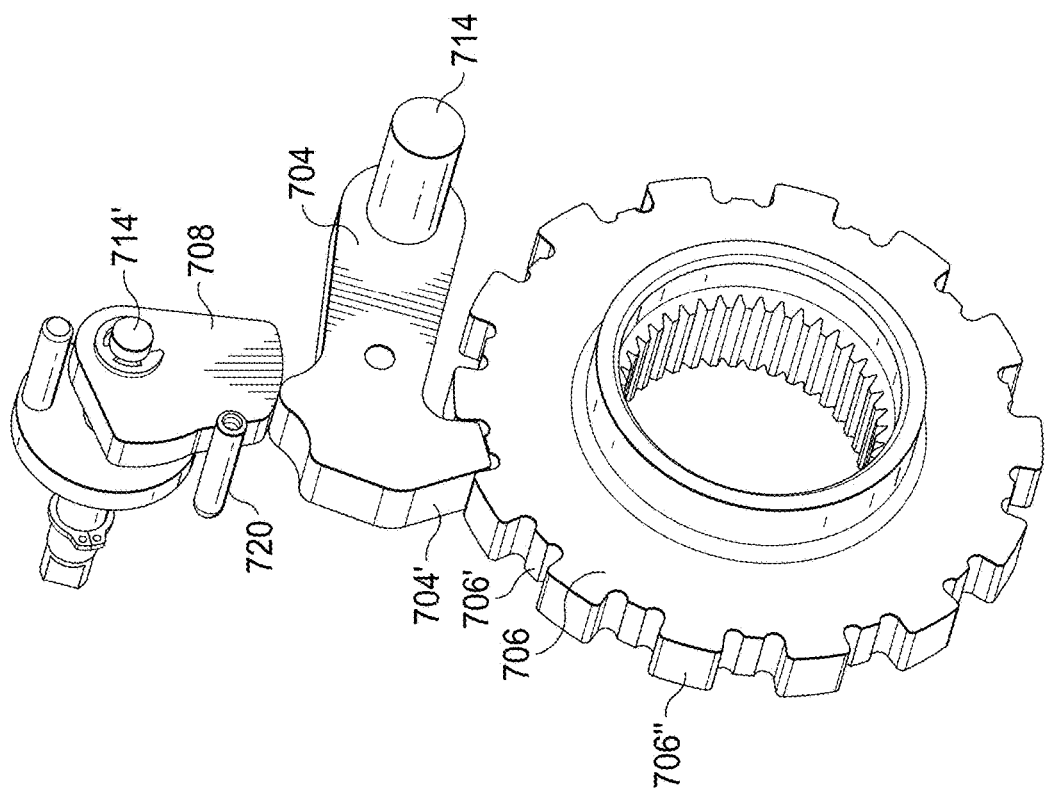
Figure 7B:
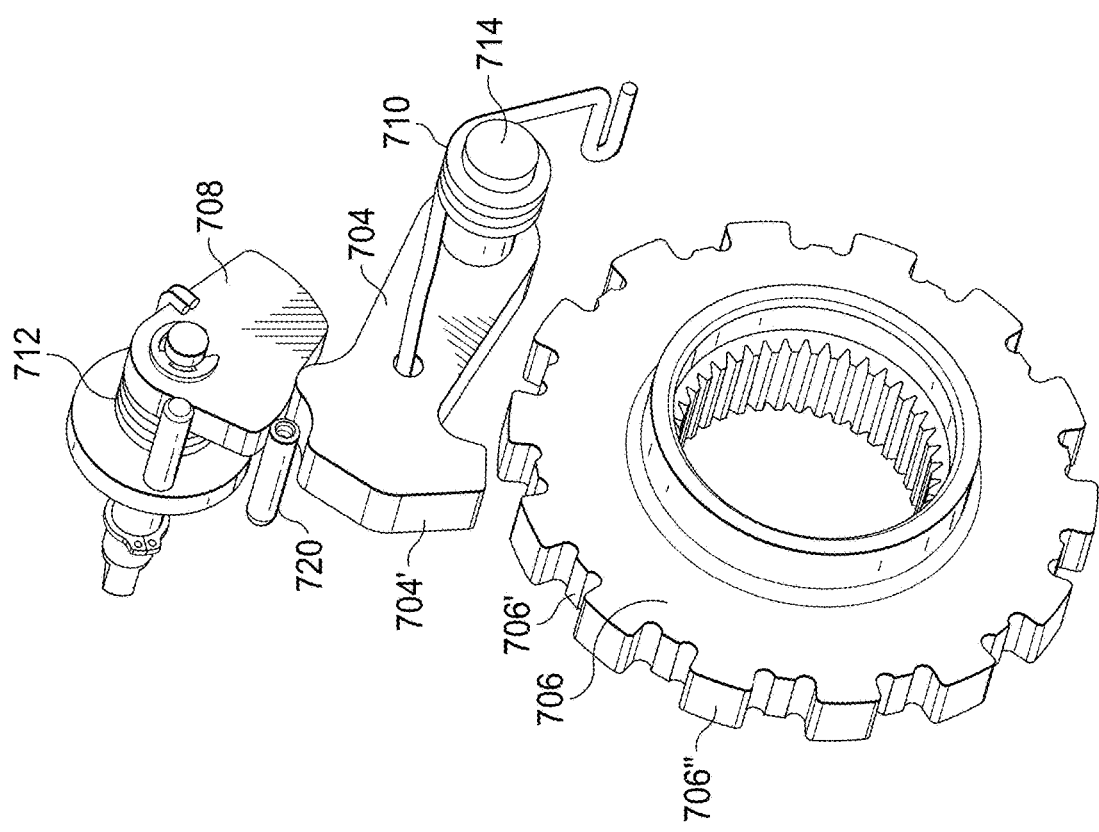
Figure 7D:
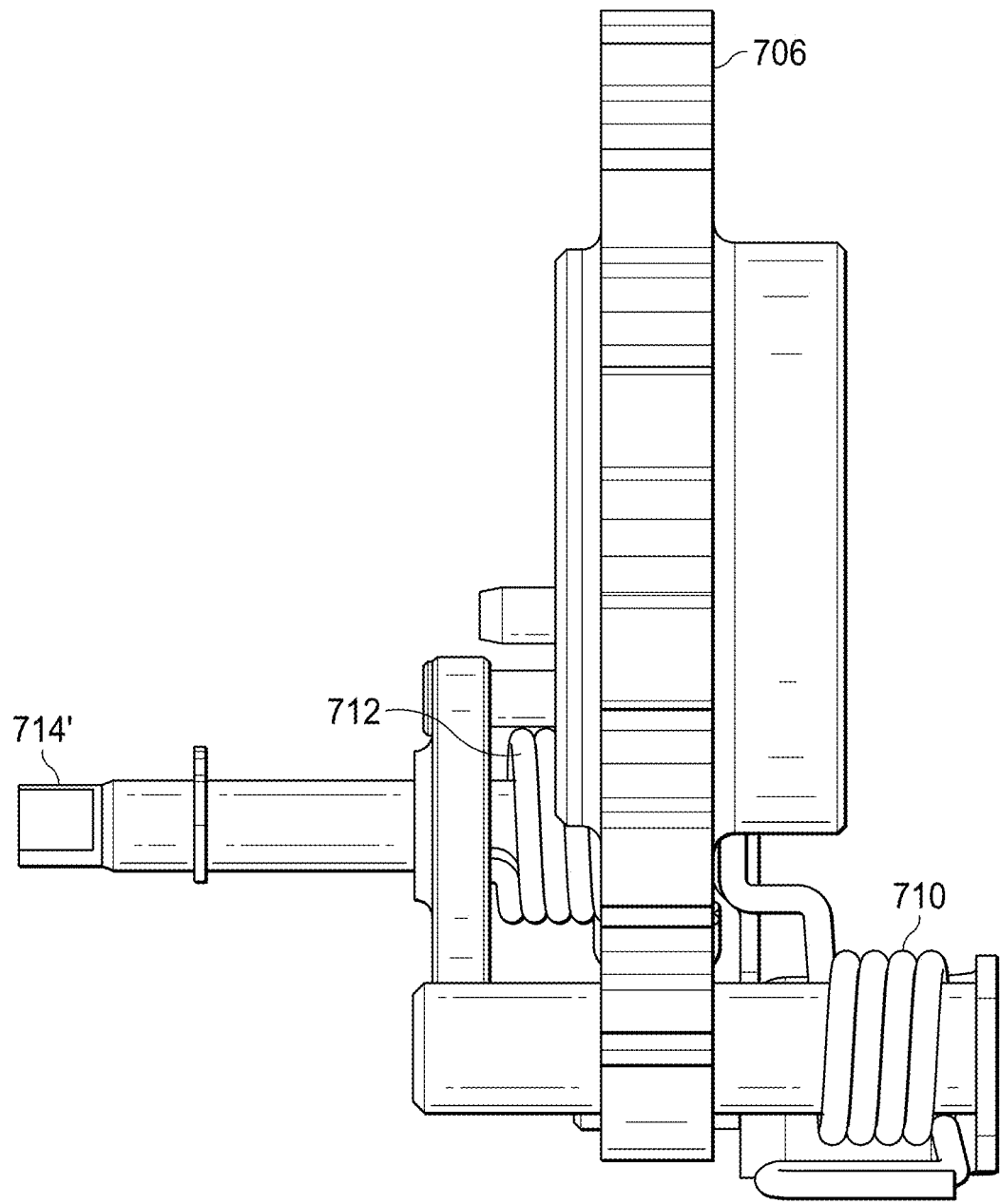

Referring now to FIGS. 7A through 7G, many embodiments may further simplify the design by replacing the rotational actuator with a rotary cam 708. FIGS. 7A, 7B and 7C illustrate an embodiment of a rotary cam 708 in relation to the pawl 704 having a pawl body disposed on a pawl rotational shaft 714 and the output drive gear 706. The rotary cam 708 may be configured to rotate into the pawl 704 thereby driving the pawl 704 towards the output drive gear 706 and engage the gear in the space 706' between the teeth 706". In many embodiments, the body of the rotary cam 708 has a ramped face 708' that is created by a step change radius. The ramped face 708' may act as an engagement face or engagement portion of the rotary cam 708 that engages with the pawl 704.

The rotary cam 708 is designed to engage with the pawl 704 in such a manner that the pawl can engage with the output drive gear 706 in a ratcheting motion until the vehicle or transmission system reduces speed to a desired and safe level. Accordingly, at low speed the pawl 704 will then be fully engaged with the output drive gear 706 in such a manner that the vehicle can safely stop or be stopped and maintained in a stopped or parked position.

Figure 7E:
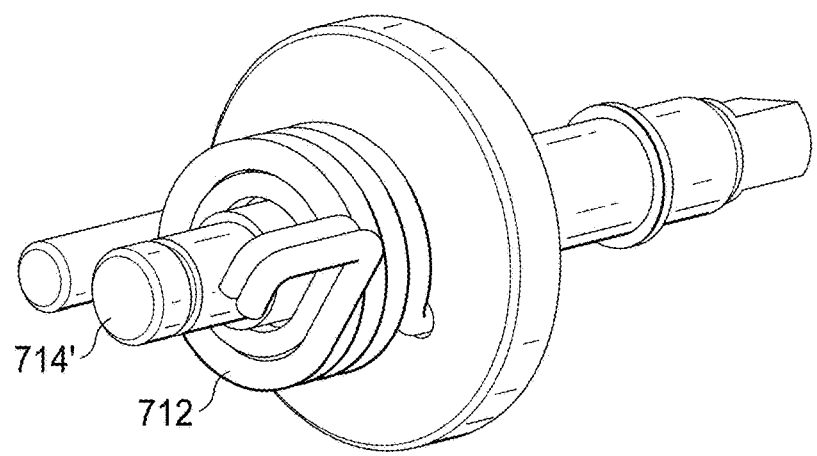
Figure 7F:
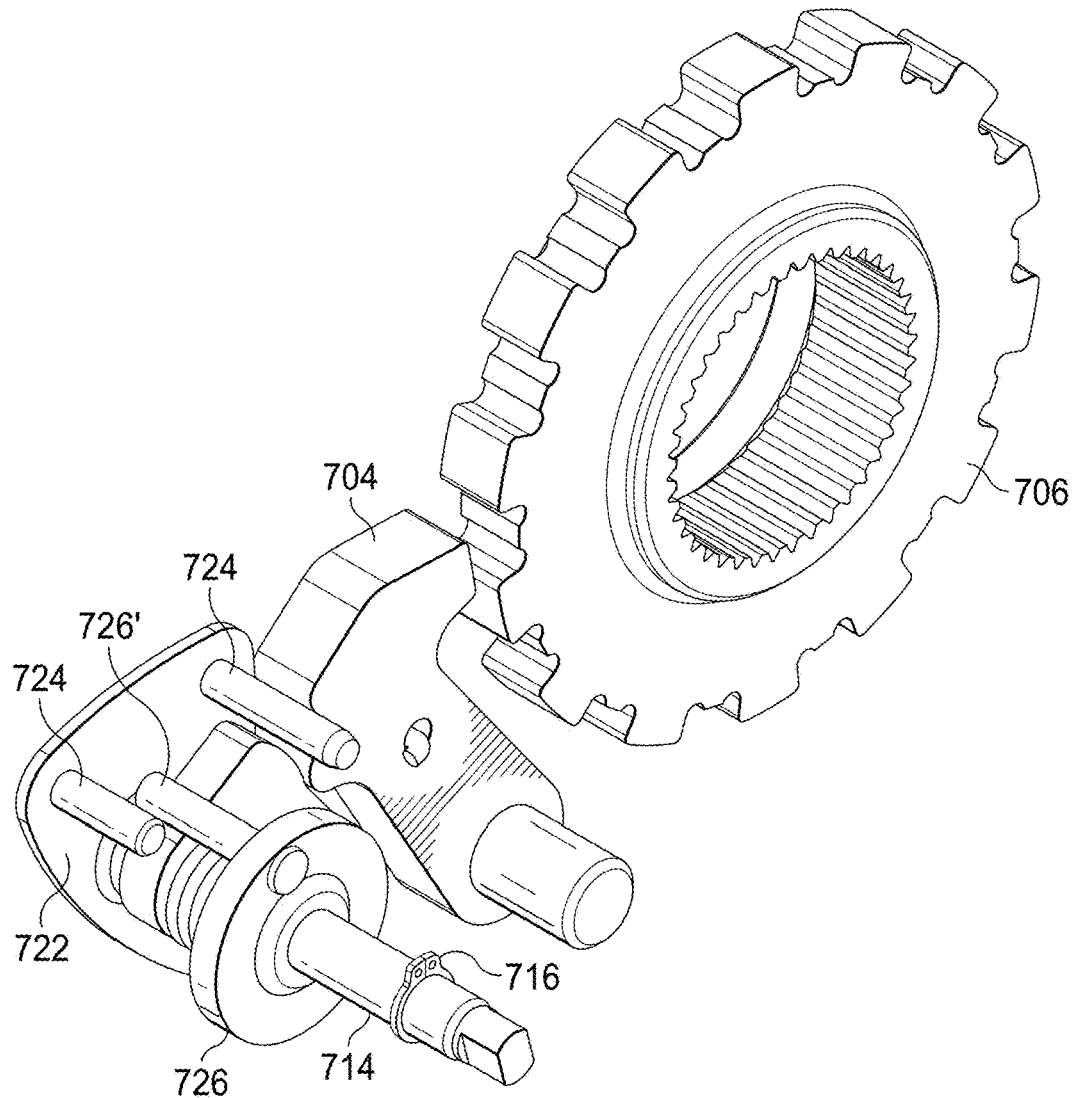
Figure 7G:
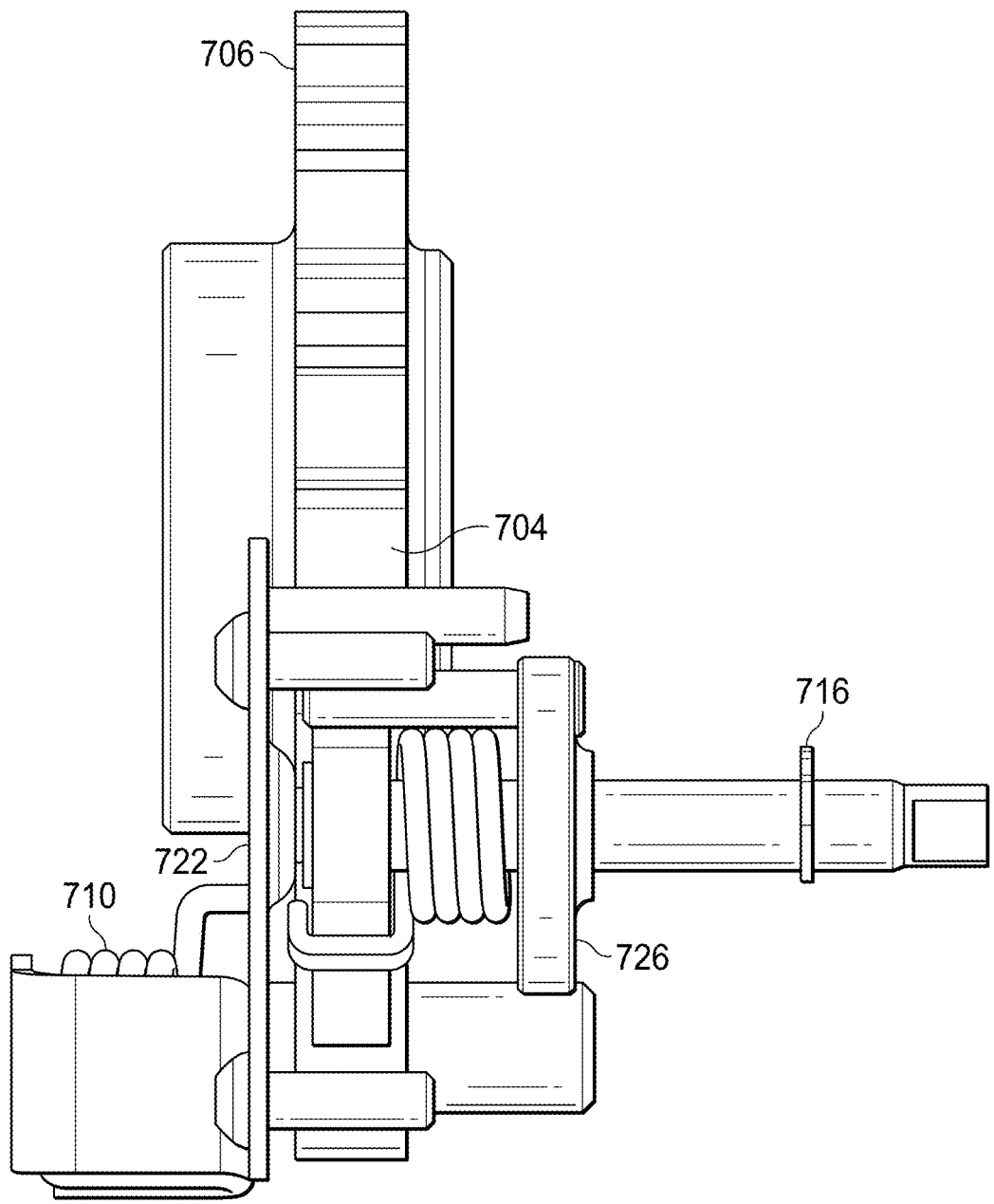

The position of the pawl 704 in the locking position may be maintained via a coaxial spring arrangement. The coaxial springs 712 may be arranged on the rotational axle actuator shaft 714' and are coaxially arranged in accordance with the rotary cam 708. As illustrated in FIG. 7E, for example, an actuator shaft 714' may be wrapped with coaxial springs 712, where the springs 712 are configured to be wrapped one on top of the other (i.e., nested). Such embodiments can aid in the rotational function of the rotator cam.

Input from a UI CAN 208 may direct the rotation of the rotational axle 714', where the rotation of the axle 714' in conjunction with collocated coaxial (nested) torsion springs 712 acts to rotate the cam 708 into the pawl 704. The movement of the pawl 704 by way of force from the rotational cam 708 may be maintained by utilizing a positional spring 710 configured on the pawl rotational shaft 714. Additionally, the positional spring 710 may be secured at one end to a portion of the drive system that is otherwise unmovable, thereby providing a fixed position about which spring tension can be maintained. The coaxial spring arrangement can keep the springs on parallel planes, thereby allowing for the reduction of space occupied by the park lock system. Reducing the space occupied by the system is an important consideration when designing an electronic drive system, because (for example) allowing for increased occupant space in the area above the vehicle platform without significant increase in overall vehicle size is desirable. Furthermore, the space reduction can translate into cost savings from both a manufacture and usage standpoint In reference to FIGS. 7F and 7G, a perspective view and a front plane view of components for an embodiment of a park lock system are provided. As previously illustrated, the cam 708 may be located on an actuator shaft 714' whose axis is offset from that of the actuator shaft of the pawl 714. The actuator shaft 714' may be configured with a stopping flange 726 that is circumferentially disposed along a portion of the actuator shaft 714'. Accordingly, the actuator shaft 714' may rotate a pin 726' that is affixed to the flange 726 in such a way as to eject the cam during disengagement so that the load does not go through the spring(s). Stopping pegs 724 function to stop or limit the movement of the cam, preventing over traveling due to the output tension from the spring 712. A fixed stopping plate 722 that has one or more stopping pegs 724 designed to limit the movement of the pawl 704 when disengaged from the output drive gear 706 may also be provided. Although illustrated apart from the entire drive system, a snap ring 716 may be provided, designed to help hold one or more components in place and affixed within the drive system. Although not shown, elements of the drive system may also be provided, to which some portions of the park lock system are affixed to in order to provide stability as well as to counter the tension of the springs (710 & 712). Pin or bump stop 720 limits the travel of the cam (708) from over-travel as the cam turns from the resting position depicted in FIG. 7B to the engaged position depicted in FIG. 7C. Nested torsion springs 712 on the cam 708 act to apply force to the cam 708 to permit ratcheting, allowing the mechanism to stay armed even when power to the actuator that drives the actuator shaft 714' is turned off. For example, the system could be engaged, and the torsion springs 712 wound up by the actuator. If the pawl 704 is position on top of a tooth 706" and the vehicle rolls, the previously wound up torsion springs 712 will still ensure the pawl tooth 704' engages in the next possible opening 706' to stop the vehicle from moving.

Figure 8A:
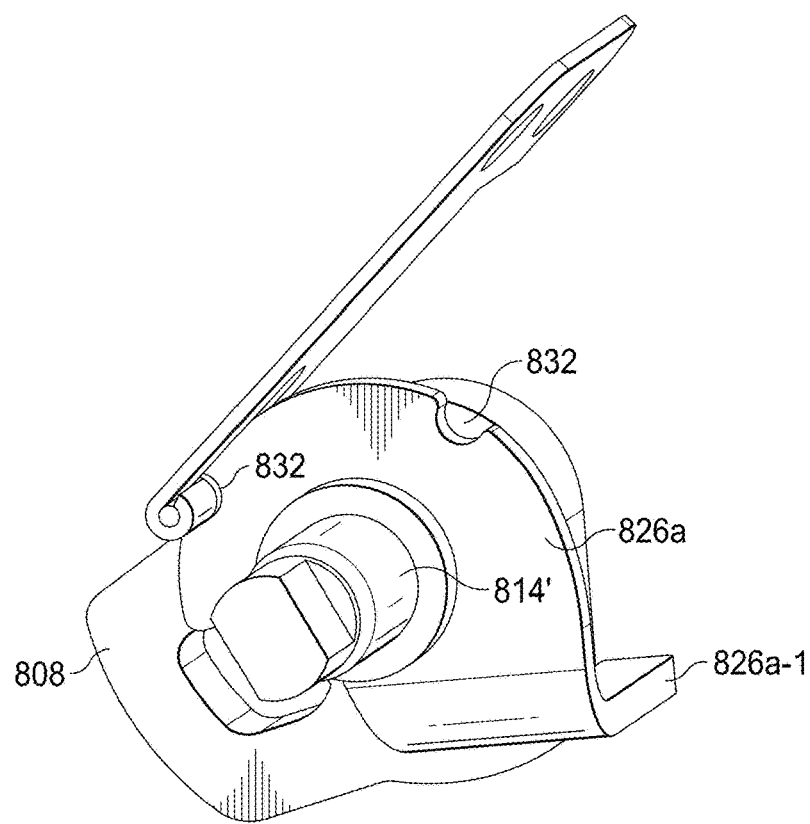
FIGS. 8A through 8C illustrate various perspective views of an alternate implementation of various components of the park lock system according to the present disclosure.
Figure 8B:
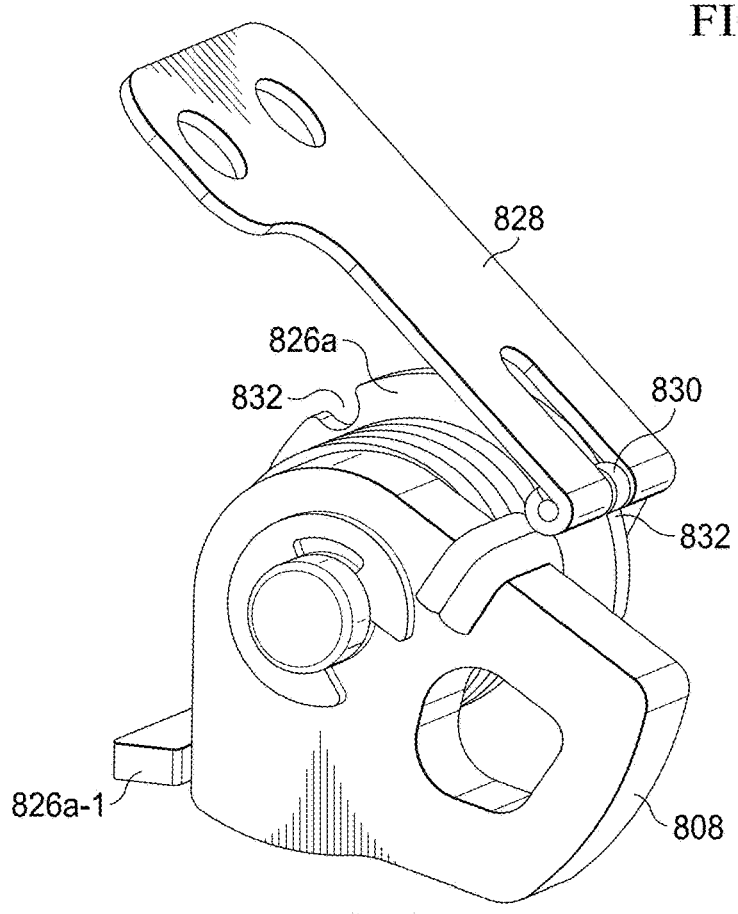
Figure 8C:
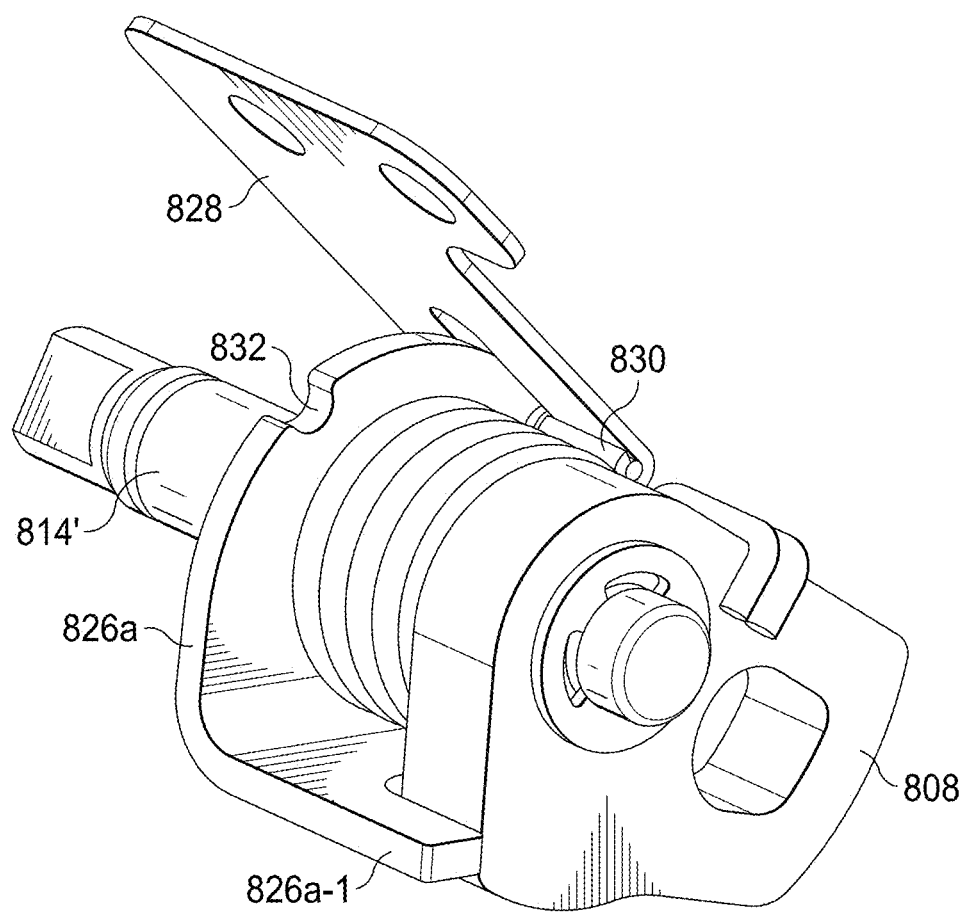

FIGS. 8A through 8C illustrate various perspective views of an alternate implementation of various components of the park lock system according to the present disclosure. This implementation shares many identically numbered aspects with the park lock system described in connection with FIGS. 7A through 7G, and these corresponding features are also applicable to this park lock embodiment. Further, FIGS. 7A through 7G illustrate many components which are not explicitly described below in connection with FIGS. 8A through 8C, but which may be present in the implementation described in connection with those figures and are numbered accordingly (e.g., rotary cam 808, and actuator shaft 814').

The implementation of a park lock system illustrated in FIGS. 8A through 8C may further include a stopping flange 826a which includes a bent portion 826a-1. The bent portion 826a-1 may be a bent over tab which extends in a direction perpendicular to the extending direction with the main body of the stopping flange 826a. This stopping flange 826a replaces the stopping flange 726 described in connection with FIGS. 7A through 7G. The bent portion 826a-1 replaces and provides similar functionality to the pin 726'. Advantageously, the bent portion 826a-1 may be integrally formed with the stopping flange 826a, which allows for more structural integrity in the stopping flange 826a. Further, the stopping flange 826a may be connected to a flat spring 828 through a roller 830. The stopping flange 826a may include two or more cutout portions 832 that interface with the roller 830. The flat spring 828 may be connected fixedly to a motor housing through fasteners (e.g., one or more pins or screws) that go through one or more holes in the flat spring 828 located at an opposite end from the roller 830. The roller 830 allows the stopping flange 826a to rotate and, when engaged with the cutout portions 832, holds the actuator shaft 814' in a fixed position when the cam 808 is engaged with the pawl 804. Advantageously, the flat spring 828 can apply tension to the system and hold the cam 808 in an engaged position with the pawl. While this system including a stopping flange 826a with cutout portions 832 and a flat spring 828 as illustrated in FIGS. 8A through 8C, implementation of features from other embodiments such as those shown in FIGS. 7A through 7G will be readily apparent to those skilled in the art.

Operation of an exemplary park lock system described in connection with FIGS. 8A through 8C includes a first stage where the roller 830 of the flat spring 828 is located within a first cutout portion of the cutout portions 832 included within the stopping flange 826a. In a second stage of operation, the roller 830 of the flat spring 828 is located between the two cutout portions 832. Between the first stage of operation and the second stage of operation, the actuator has rotated the stopping flange 826a, which causes the roller 828 to roll along the outside edge of the stopping flange 826a. In a third stage of operation, the roller 830 of the flat spring 828 is located in a second cutout portion of the cutout portions 832. Advantageously, the flat spring 828, through the roller 830, acts as a holding mechanism for the stopping flange 826a. As the actuator rotates the actuator shaft 814' of the pawl, which rotates the stopping flange 826a, the cam 808 is engaged with the pawl. The flat spring 828 applies tension to the system such that the actuator does not have to maintain torque on the system to keep the pawl 804 engaged with the gear(s). Then the actuator can release tension and allow the system to rotate back and disengage with the gears. The flat spring 828 may be coupled to the motor housing through a pin (not shown) around which an end of the flat spring 828 is wrapped.

Figure 9A:
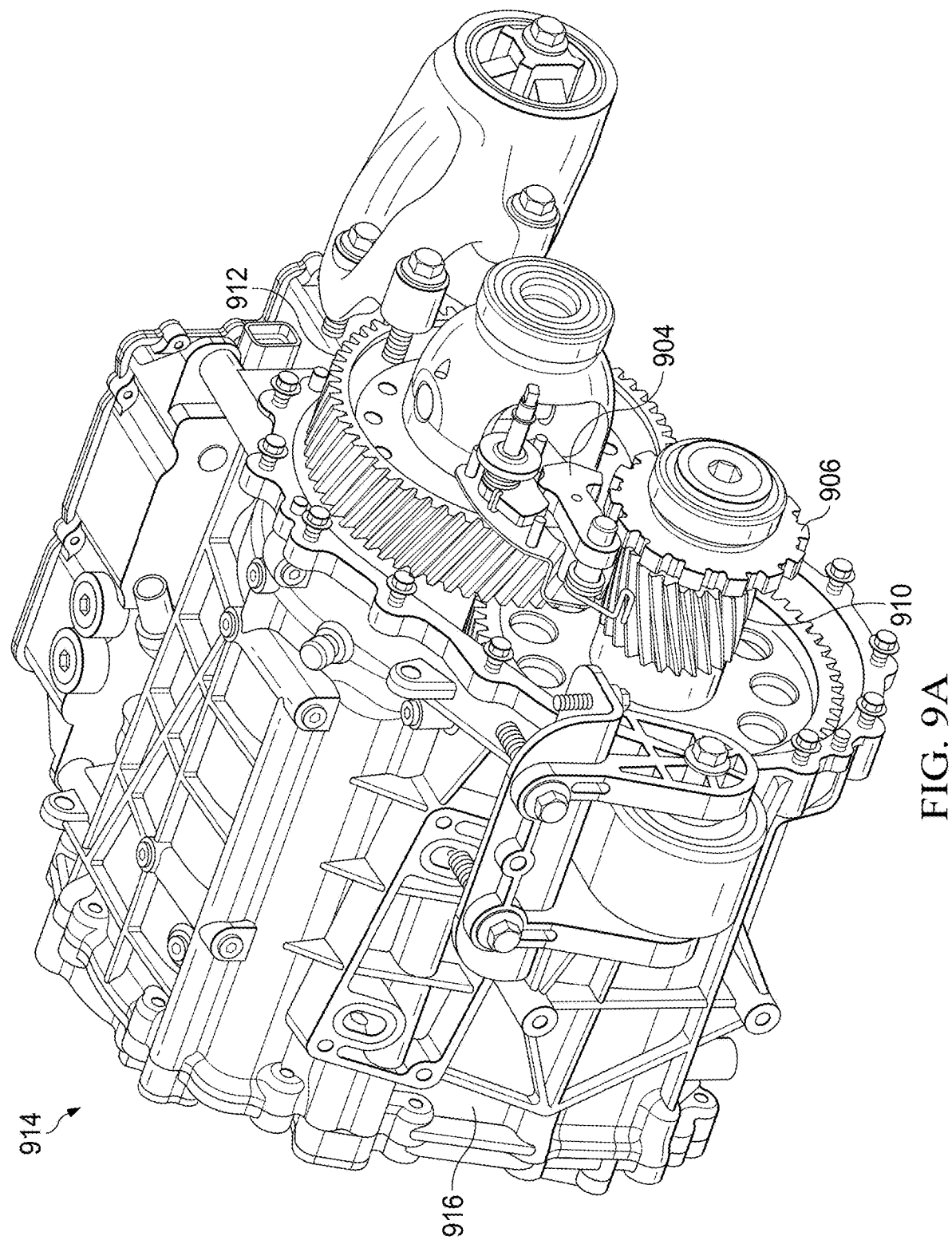
FIGS. 9A through 9C illustrate a park lock system in relation to other elements of an electronic drive system in accordance with embodiments of the present disclosure.
Figure 9B:
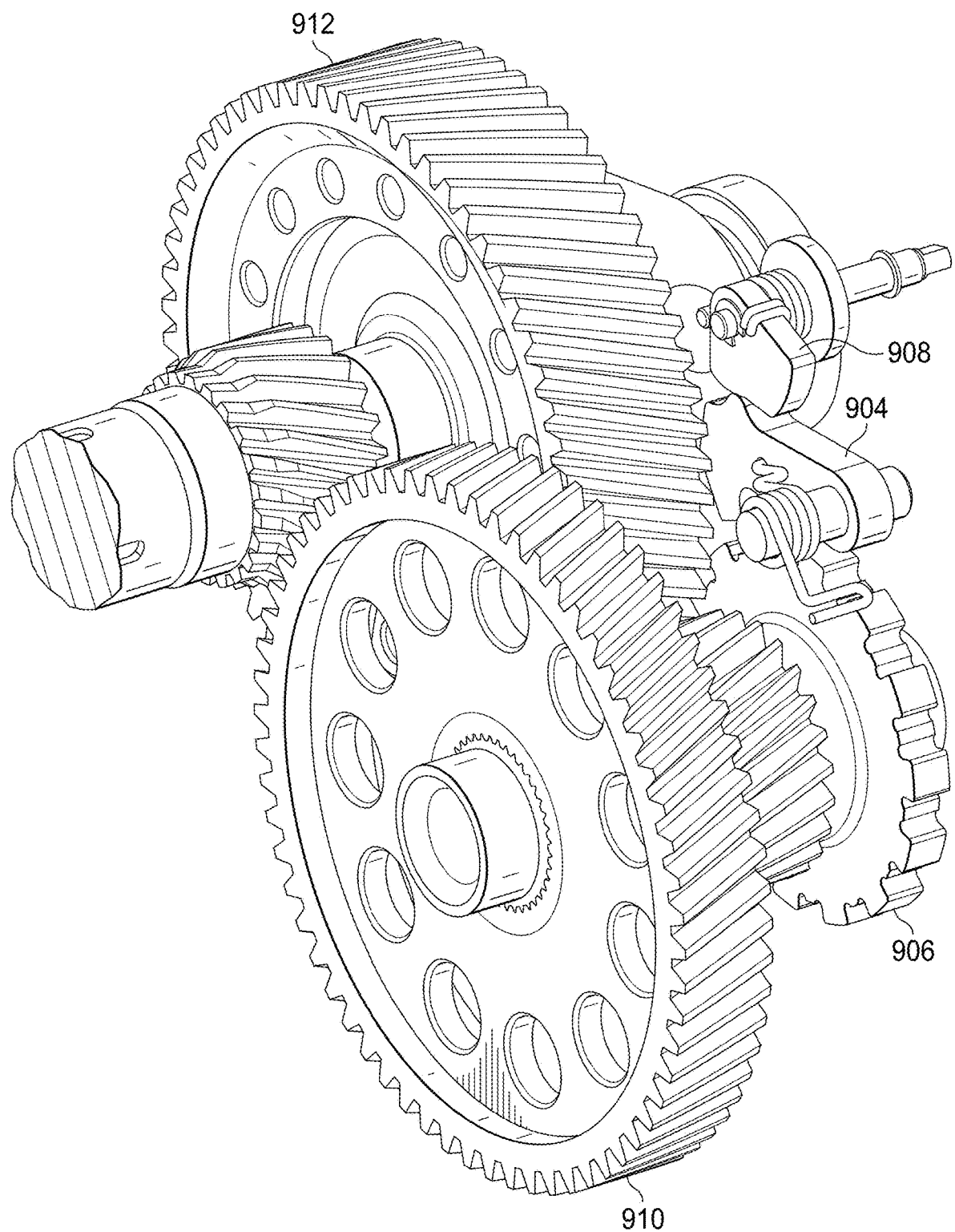
Figure 9C:
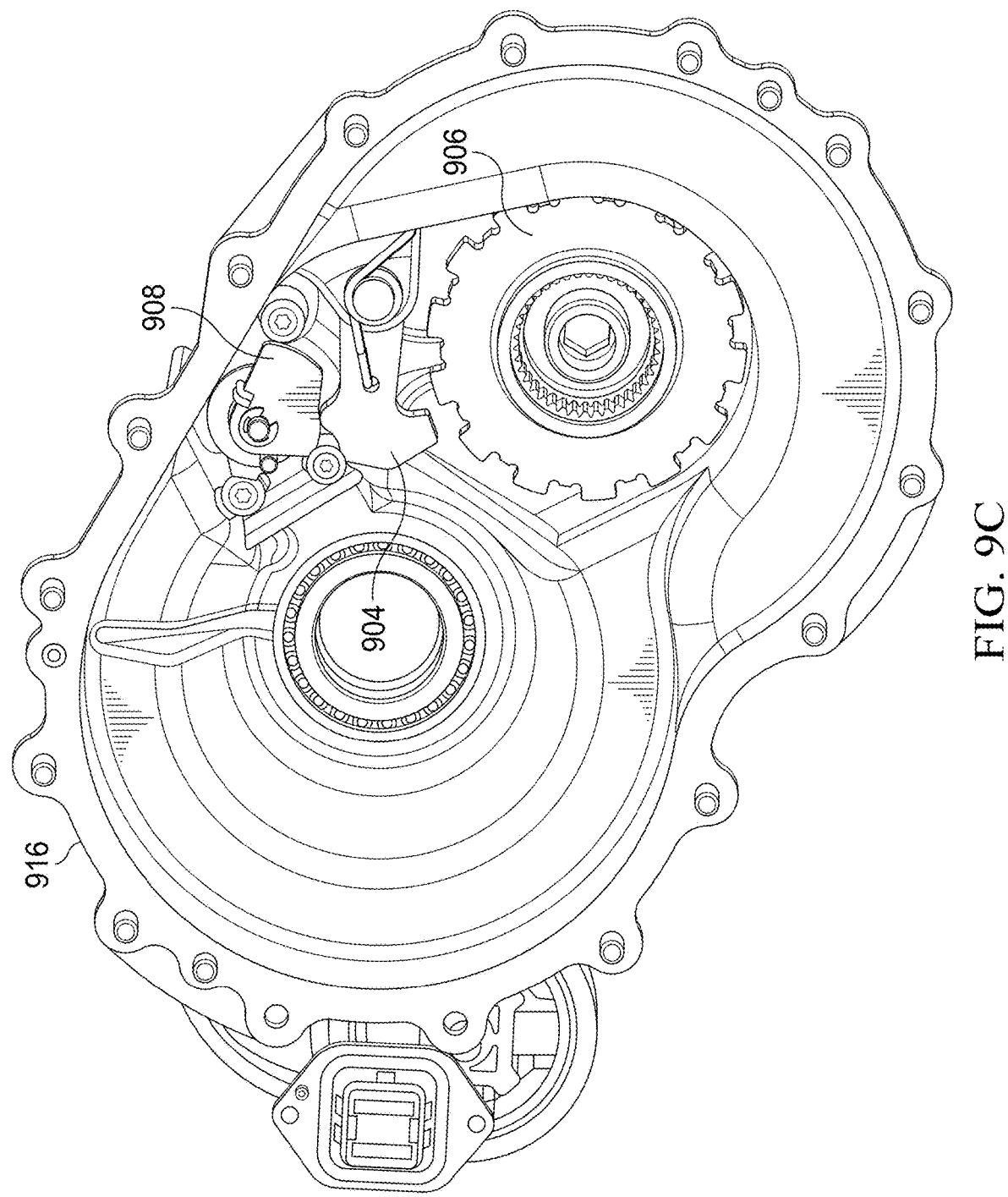

Referring now to FIGS. 9A through 9C, a park lock system is illustrated in relation to other elements of an electronic drive system in accordance with embodiments of the present disclosure. As illustrated in FIG. 9A, the drive system 914 may have multiple components such as a casing 916 that may be implemented by more than one element, such that a portion (shown in FIG. 9C) thereof can be removed as depicted in FIG. 9C. The embodiment illustrated in FIG. 9A shows the portion of the casing 916 from FIG. 9C as removed from the drive system 914, such that some of the gears (910, 912) as well as the park lock system (904, 906, 908) are exposed and accessible for maintenance and/or replacement. Accordingly, the park lock system (904, 906, 908) may be positioned within the drive system 914 such that, once engaged, the output drive gear 906 may stop all movement of the other gears (910, 912) so that the drive system is inhibited from movement. The opposite may also be true for engaging the drive system gears and disengaging the park lock system.

FIG. 9B illustrates an embodiment of the park lock that may utilize the various elements previously discussed, such as the pawl 904, the cam 908, and the output drive wheel 906. The output drive wheel 906 may be coaxially located with various gears 910 that are biaxially aligned with and configured to interface with other gears 912 that make up portions of the overall drive system. The park lock system can interface with the various gears (910, 912) and systems of an overall drive system 914. As shown in FIG. 9C, some components (the pawl 904, the cam 908, and the output drive wheel 906) may actually be mounted inside the removable portion of the casing 916.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:
1. A park lock, comprising:
an output drive gear disposed on an output drive shaft and having engagement projections extending outwardly from a circular body and wherein the engagement projections form an engagement space between adjacent pairs of the engagement projections;
a pawl having a body with an engagement protrusion extending outward from the body, the body disposed on a pawl rotational shaft at a first end of the body such that rotation of the pawl about the pawl rotational shaft rotates the engagement protrusion in a direction of the output drive gear;

a rotational cam disposed on a cam shaft that is rotated such that a circumferential cam side face engages with a portion of the pawl opposite the engagement protrusion to cause the rotation of the pawl about the pawl rotational shaft to thereby move the engagement protrusion towards the output drive gear into one of the engagement spaces between the engagement projections;

at least one rotational spring connected to maintain tension on the pawl and cam such that the engagement protrusion maintains an engagement with the engagement spaces and engagement projections that is based on rotation of the cam and a speed of the output drive gear, wherein the engagement protrusion engages the engagement spaces and engagement projections in a ratcheting motion when the speed of the output drive gear is above a threshold and fully engages the engagement spaces and engagement projections when the speed of the output drive gear is at or below the threshold; and a stopping flange disposed on an actuator shaft and configured to limit movement of the pawl, wherein the stopping flange comprises a stopping pin extending from the stopping flange in a direction parallel with the actuator shaft and configured to be stopped by a fixed stopping plate.

2. The park lock according to claim 1, wherein the circumferential cam side face of the rotational cam has a region of increasing radius.

3. The park lock according to claim 2, wherein the circumferential cam side face of the rotational cam has a stepped change in radius.

4. The park lock according to claim 1, wherein the at least one rotational spring comprises one of a torsion spring or nested torsion springs.

5. The park lock according to claim 1, wherein the at least one spring comprises a first torsion spring wrapped around the pawl rotational shaft.

6. The park lock according to claim 1, wherein the at least one rotational spring comprises a first torsion spring wrapped around the pawl rotational shaft and a second torsion spring wrapped around the cam shaft.

7. The park lock according to claim 1, further comprising: nested coaxial springs wrapped around the actuator shaft.

8. The park lock according to claim 1, wherein the pawl and the rotational cam are mounted inside a removable portion of a casing for a drive assembly.

9. A park lock, comprising:

an output drive gear disposed on an output drive shaft and having engagement projections extending outwardly from a circular body and wherein the engagement projections form an engagement space between adjacent pairs of the engagement projections;

a pawl having a body with an engagement protrusion extending outward from the body, the body disposed on a pawl rotational shaft such that rotation of the pawl about the pawl rotational shaft rotates the engagement protrusion in a direction of the output drive gear;

a rotational cam disposed on a cam shaft that is rotated such that a circumferential cam side face engages with a portion of the pawl opposite the engagement protrusion to cause the rotation of the pawl about the pawl rotational shaft to thereby move the engagement protrusion towards the output drive gear into one of the engagement spaces between the engagement projections;

at least one rotational spring connected to maintain tension on the pawl and cam such that the engagement protrusion maintains an engagement with the engagement spaces and engagement projections that is based on rotation of the cam and a speed of the output drive gear, wherein the engagement protrusion is configured to engage the engagement spaces and engagement projections in a ratcheting motion when the speed of the output drive gear is above a threshold corresponding to the tension on the pawl and cam and to fully engage the engagement spaces and engagement projections when the speed of the output drive gear is at or below the threshold; and a stopping flange on an actuator shaft, the stopping flange including a bent portion extending in a direction parallel with the actuator shaft and configured to limit movement of the pawl.

10. The park lock according to claim 9, wherein the bent portion is configured to contact a surface of the rotational cam.

11. A method of locking an automatic transmission, the method comprising:

disposing an output drive gear on an output drive shaft and having engagement projections extending outwardly from a circular body and wherein the engagement projections form an engagement space between adjacent pairs of the engagement projections;

providing a pawl having a body with an engagement protrusion extending outward from the body, the body disposed on a pawl rotational shaft at a first end of the body such that rotation of the pawl about the pawl rotational shaft rotates the engagement protrusion in a direction of the output drive gear;

disposing a rotational cam on a cam shaft that is rotated such that a circumferential cam side face engages with a portion of the pawl opposite the engagement protrusion to cause the rotation of the pawl about the pawl rotational shaft to thereby move the engagement protrusion towards the output drive gear into one of the engagement spaces between the engagement projections; and connecting at least one rotational spring to maintain tension on the pawl and cam such that the engagement protrusion maintains an engagement with the engagement spaces and engagement projections that is based on rotation of the cam and a speed of the output drive gear, wherein the engagement protrusion engages the engagement spaces and engagement projections in a ratcheting motion when the speed of the output drive gear is above a threshold and fully engages the engagement spaces and engagement projections when the speed of the output drive gear is at or below the threshold.

12. The method according to claim 11, wherein the circumferential cam side face of the rotational cam has a region of increasing radius.

13. The method according to claim 12, wherein the circumferential cam side face of the rotational cam has a stepped change in radius.

14. The method according to claim 11, wherein the at least one rotational spring comprises one of a torsion spring or nested torsion springs.

15. The method according to claim 11, wherein the at least one rotational spring comprises a first torsion spring wrapped around the pawl rotational shaft.

16. The method according to claim 11, wherein the at least one rotational spring comprises a first torsion spring wrapped around the pawl rotational shaft and a second torsion spring wrapped around a rotation shaft for the cam.

17. The method according to claim 11, further comprising:
   providing a stopping flange configured to limit movement of the pawl.

18. The method according to claim 17, wherein the stopping flange comprises a stopping pin configured to be stopped by stopping pegs on a fixed stopping plate.

19. The method according to claim 17, wherein the stopping flange comprises a bent portion configured to contact a surface of the rotational cam.

20. The method according to claim 11, further comprising:
   mounting the pawl and the rotational cam inside a removable portion of a casing for a drive assembly.

* * * * *